(12) United States Patent
Schie

(10) Patent No.: US 10,097,243 B2
(45) Date of Patent: Oct. 9, 2018

(54) ISOLATOR

(71) Applicant: David Schie, Cupertino, CA (US)

(72) Inventor: David Schie, Cupertino, CA (US)

(*) Notice: Subject to any disclaimer, the term of this patent is extended or adjusted under 35 U.S.C. 154(b) by 341 days.

(21) Appl. No.: 14/214,722

(22) Filed: Mar. 15, 2014

(65) Prior Publication Data

US 2015/0079901 A1  Mar. 19, 2015

Related U.S. Application Data

(60) Provisional application No. 61/787,043, filed on Mar. 15, 2013.

(51) Int. Cl.
*G01R 19/00* (2006.01)
*H04B 5/00* (2006.01)

(52) U.S. Cl.
CPC ......... *H04B 5/0012* (2013.01); *H04B 5/0031* (2013.01)

(58) Field of Classification Search
CPC ..... H04L 25/0266; H04L 25/06; H04L 7/033; H04M 11/06; B32B 17/10036; B32B 17/10174; B32B 17/10761; B60S 1/0822; B60S 1/0825
See application file for complete search history.

(56) References Cited

U.S. PATENT DOCUMENTS

| | | | |
|---|---|---|---|
| 6,385,235 B1* | 5/2002 | Scott | H04L 25/0266 375/220 |
| 6,603,807 B1* | 8/2003 | Yukutake | H04L 25/0266 257/532 |
| 2008/0079510 A1* | 4/2008 | Seethamraju | H03L 7/087 331/179 |
| 2011/0163352 A1* | 7/2011 | Gee | H01L 23/60 257/173 |
| 2014/0117955 A1* | 5/2014 | Zoso | H02M 3/157 323/271 |

* cited by examiner

Primary Examiner — Sibin Chen
(74) Attorney, Agent, or Firm — Weiss & Moy, P.C.; Jeffrey D. Moy

(57) ABSTRACT

A monolithic isolator circuit is provided which replaces optocoupler feedback configurations which are prone to wear out, lack reliability, and bandwidth limitations. By communicating only a subset of a sigma delta modulators quantizer across the isolator but closing the modulator loop on the primary side, much wider bandwidth communications of analog information can be achieved than with optocouplers. This allows for the use of the proposed isolator for cycle by cycle loop control and protection functions which previously required components on the local side of the isolation. The monolithic isolator circuit can be extended to isolate analog to digital converters (ADC), analog buffers, and to isolated current sense amplifiers (CSA). The monolithic isolator circuit utilizes a z-domain differential delay line to create an error in conformance with the difference between the feedback magnitude and a reference. Z-domain differential delay lines have a fast response, and may be windowed and event driven making these delay lines very current efficient. The conformance error may be fed to a digital compensator (such as a proportional-integral-derivative (PID) compensator) and finally to a z-domain modulator. The z-domain modulator may be one of several constructions, however, to achieve a reasonable number of bits a delta sigma structure, such as an error feedback structure, is utilized for the modulator.

15 Claims, 11 Drawing Sheets

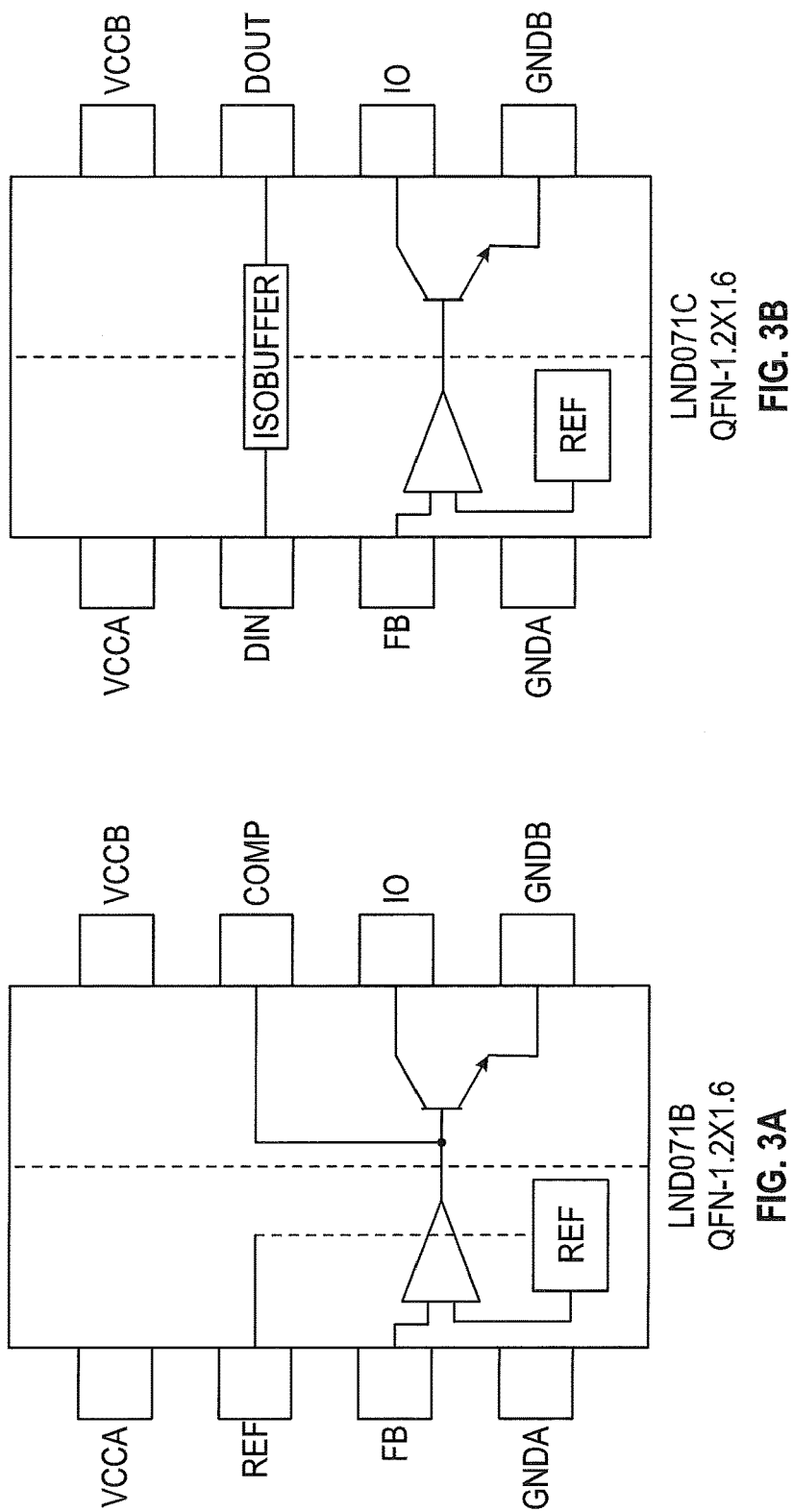

ISOLATOR

CROSS-REFERENCE TO RELATED APPLICATION

This application claims priority of U.S. Provisional Patent Application Ser. No. 61/787,043 filed Mar. 15, 2013, which is incorporated herein by reference.

FIELD OF THE INVENTION

The present invention in general relates to electronic components in particular to improved isolator devices.

BACKGROUND OF THE INVENTION

Isolated systems, such as AC/DC converters or DC/DC converters (which require isolation ratings of greater than 1,500V) have long utilized a combination of an error amplifier/reference and an optocoupler to feedback output voltage information and to close the loop of the isolated system. The most commonly used device for creating an isolated system is a TL431 shunt reference (an error amplifier and optocoupler combination) and a standard optocoupler. There are many companies which make variants of the TL431 shunt reference and the TL431 is one of the highest volume semiconductor devices in the industry.

Over time, improvements on the TL431 have been made including low power CMOS implementations and versions with wider bandwidth capabilities. Similar improvements have also been made to other optocoupler components. Such solutions are known as wide bandwidth isolators. Products including wide bandwidth optical isolators are used for measuring current in isolated AC/DC or DC/AC systems such as solar panels or motor drivers. These high bandwidth systems provide critical protection information and therefore any reliability deficiency is of serious concern. By communicating only a subset of a sigma delta modulators quantizer across the isolator but closing the modulator loop on the primary side, much wider bandwidth communications of analog information can be achieved than with optocouplers. This allows for the use of the proposed isolator for cycle by cycle loop control and protection functions which previously required components on the local side of the isolation.

Regardless of the improvements, optoisolators have a tendency to frequently wear out, and are considered one of the least reliable components in an isolated system. To overcome the lack of operational robustness and reliability of optoisolators, various solutions have been introduced which range from using multiple optocouplers for redundancy, to primary side feedback controllers which attempt to forgo an optocoupler altogether. Although primary side feedback and redundancy have been adopted in various applications, redundancy is costly and still does not eliminate the wear out mechanisms in optocouplers. Further, serial redundant systems are even more expensive due to the components which have to determine when to move to a different or newer optocoupler. Parallel redundant systems improve statistical failures but the tendency of the optocoupler to wear out remains. Primary side feedback has eliminated optocoupler components in various systems but at the price of accuracy, complexity, and periods during which output information is unavailable.

Additional methods of creating isolation include near field RF isolators as well as magnetically or capacitively coupled systems. However, RF isolators tend to be expensive and use a lot of power, as RF isolators require dual die and operate at very high frequencies, and while magnetically and capacitively coupled monolithic systems are good monolithic solutions, they are AC only systems and are generally suitable for communicating digital data only.

Z-domain techniques, which utilize delay cells and discrete mathematics to create transfer functions have long been recognized as an efficient replacement for various continuous time systems. Discrete systems, however, can result in non-desirable limit cycle oscillations when used to control feedback loops. The spectrum of these oscillations can be difficult to predict, and therefore transfer functions created from delay or digital techniques are rare in AC/DC and DC/DC isolated systems. While limit cycle oscillations can be rendered too small to be relevant as well as predictable by increasing the effective number of bits of quantization, this requires high order data converters which are too slow for AC/DC and DC/DC applications.

It would therefore be desirable to create an isolated system capable of utilizing capacitive coupling which could be used to replace the functionality of an optically isolated feedback system, while eliminating existing isolation method deficiencies and despite the AC only restrictions of capacitive coupling and further to eliminate concerns about limit cycle oscillations.

SUMMARY OF THE INVENTION

A monolithic isolator circuit is provided which allows accurate high bandwidth communication of analog information across an isolation barrier. By communicating only a subset of a sigma delta modulators quantizer across the isolator but closing the modulator loop on the primary side, much wider bandwidth communications of analog information can be achieved than with optocouplers. This allows for the use of the proposed isolator for cycle by cycle loop control and protection functions which previously required components on the local side of the isolation. Embodiments of the monolithic isolator circuit replaces standard optocoupler feedback configurations in AC/DC or DC/DC systems or similar products such as wideband optoisolators which are prone to wear out, lack reliability, and have bandwidth limitations. Embodiments of the inventive monolithic isolator circuit can be extended to isolated analog to digital converters (ADC), analog buffers, and to isolated current sense amplifiers (CSA).

Embodiments of the inventive monolithic isolator circuit utilize a z-domain differential delay line to create an error in conformance with the difference between the feedback magnitude and a reference, Z-domain differential delay lines have a fast response, and may be windowed and event driven making these delay lines very current efficient. In inventive embodiments, the conformance error may be fed to a digital compensator (such as a proportional-integral-derivative (PID) compensator) and finally to a z-domain modulator. The z-domain modulator may be one of several constructions, however, to achieve a reasonable number of bits a delta sigma structure, such as an error feedback structure, is utilized for the modulator.

BRIEF DESCRIPTION OF THE DRAWINGS

The present invention is further detailed with respect to the following drawings. These figures are not intended to limit the scope of the present invention but rather illustrate certain attributes thereof.

FIG. 3A is a schematic of an embodiment of the inventive isolator which may be connected to a passive network or programmed digitally to establish AC parameters;

FIG. 3B is a schematic of an embodiment of the inventive isolator with a digital communication path across the isolator which shares the isolator;

DESCRIPTION OF THE INVENTION

Figure 1:
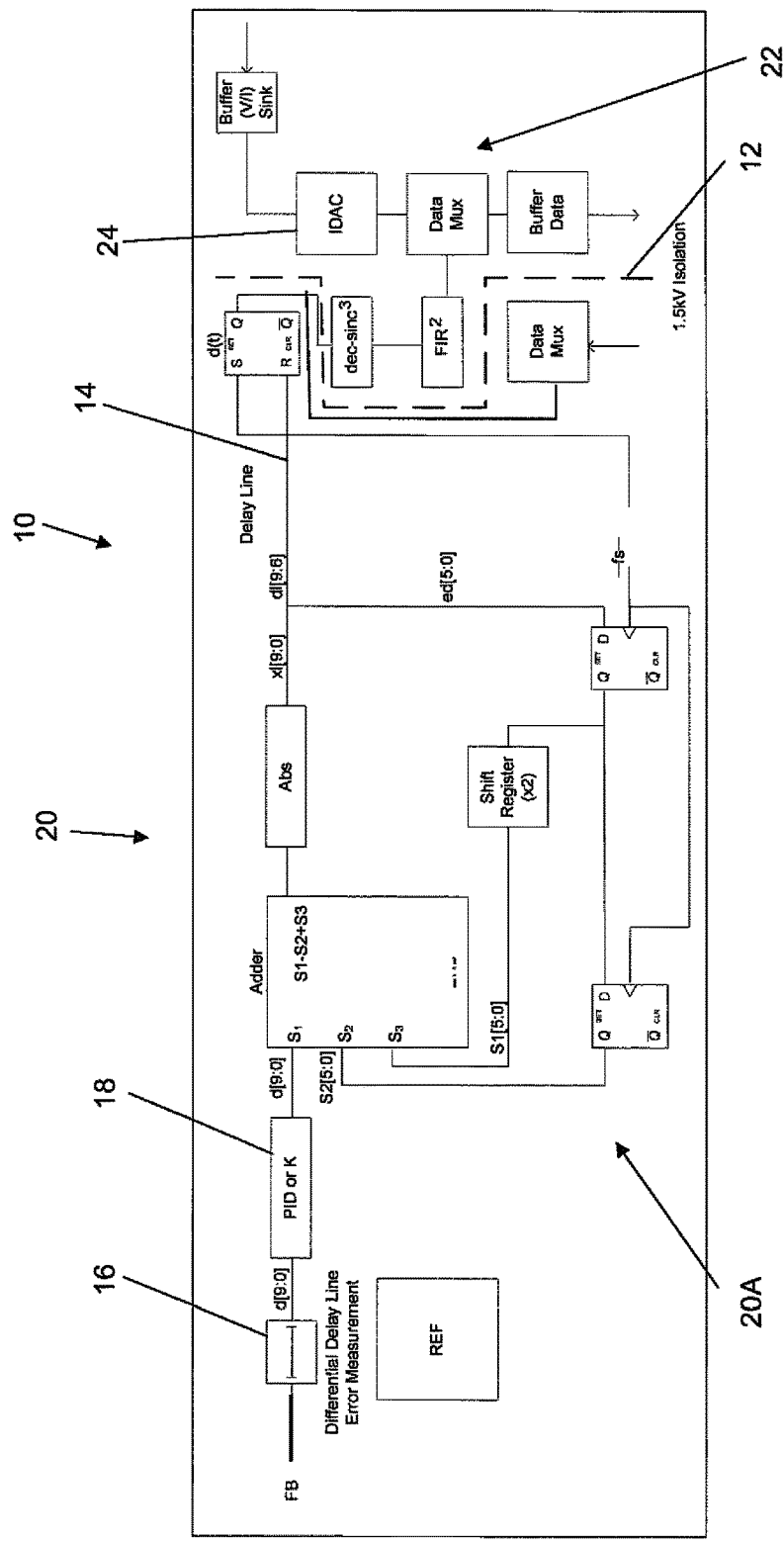
FIG. 1 is a block diagram of a proposed isolator.

A monolithic isolator circuit 10 is provided which allows accurate communication of analog information across an isolation barrier 12. Embodiments of the monolithic isolator circuit 10 replace standard TL431 and optocoupler feedback configurations in AC/DC or DC/DC systems or similar products such as wideband optoisolators which are prone to wear out, lack reliability, and have bandwidth limitations. Embodiments of the inventive monolithic isolator circuit 10 can be extended to isolated analog to digital converters (ADC), analog buffers, and to isolate current sense amplifiers (CSA).

Embodiments of the inventive monolithic isolator circuit 10 utilize a z-domain differential delay line 14 to create an error 16 in conformance with the difference between the feedback magnitude FB and a reference REF. Z-domain differential delay lines have a fast response, and may be windowed and event driven making these delay lines very current efficient. In inventive embodiments, the conformance error may be fed to a digital compensator 18 (such as a proportional-integral-derivative (RD) compensator) and finally to a z-domain modulator 20. The z-domain modulator 20 may be one of several constructions; however, to achieve a reasonable number of bits a delta sigma structure 20A, such as an error feedback structure, is utilized for the modulator.

In embodiments of the inventive monolithic isolator circuit 10, a limited number of bits (MSBs) are transferred across the isolation boundary 12, while feedback of LSBs is done on the primary side to improve the equivalent bit resolution improvement attributed to digital error feedback techniques. By communicating only a subset of the quantizer output the capacitive coupler has to transfer less information with a lower required capacitive isolator bandwidth. The resultant remaining bandwidth could therefore be put to other uses, such as a digital channel with its information multiplexed into the digital data stream crossing the isolation barrier 12 to the limit of the bandwidth of the capacitive isolator or to expand the maximum frequency of waveform components that the system can communicate to the secondary side. The digital data may then be extracted on the isolated side by standard de-multiplexing techniques, and the modulator data passed to an appropriate decimation scheme 22 to create the equivalent high resolution digital output which can then be passed to a simple DAC 24, such as a current DAC, to create an analog output, or the digital information may be used directly. The digital channel is completely unrelated to the feedback converter, and could be used to communicate digital data such as power line carrier, dimming signals, sensor or control data to devices on the secondary side.

In inventive embodiments in order to reduce required bandwidth there is a reduction in the amount of information being transferred across the isolation boundary, where only a subset of the quantization output information is sent across the boundary. Although the data of the quantization output information has a limited number of bits and therefore a large quantization error, the delta sigma feeds back this information on the primary side, and over time the average output of the quantizer will represent a much higher resolution due to the digital feedback. By including an appropriate decimator on the secondary (isolated) side, we will output an average value of high accuracy despite the fact that only a subset of the quantizer output crosses the isolation boundary.

In the inventive embodiments, the creation of a compact, low cost, delta sigma scheme capable of efficiently utilizing capacitive coupling to cross the isolation barrier allows for additional types of isolators to be created. Specifically, an analog ADC converter may be created by linearizing the delay line so that its output is proportional to the input signal, and by converting the proportional-integral-derivative (PID) to a constant or unity gain, and then outputting the decimated information in digital form to the outside world.

Furthermore, a voltage to voltage converter may also be made by taking the decimated digital information above and utilizing a simple DAC such as a current DAC to create an analog output on the secondary (isolated) side. This converter can easily be made into a current sense amplifier (CSA) by ensuring the delay line gain is fixed and finite (for example 50V/V or 100V/V). In this case the input is the voltage across a sense element such as a resistor of a Hall Effect sensor. This CSA could have a high enough bandwidth to handle cycle by cycle pulse width modulation (PWM) current or fault monitoring utilizing the proposed scheme as it has a cry high bandwidth capability, far greater than a typical process could achieve with analog only components.

Due to possibility of very wide bandwidths, it becomes necessary to include a loop compensator where the proposed component is used in an isolator error amplifier configuration. To program the poles and zeros of the proposed isolator external passives might be connected to the proposed part such as to the comp pin shown in FIG. 3A. These passives may be probed upon turn on to determine the poles and zeros of the system using network characterization techniques known to those skilled in the art and then an internal compensator may be replicated utilizing a discrete implementation with similar poles and zeros locations. An example might be a PID network common in electrical power supply loops. Alternatively, the COMP pin or the COMP pin in combination with other pins may be used as a digital interface to load compensator information into the device digitally.

Figure 7A:
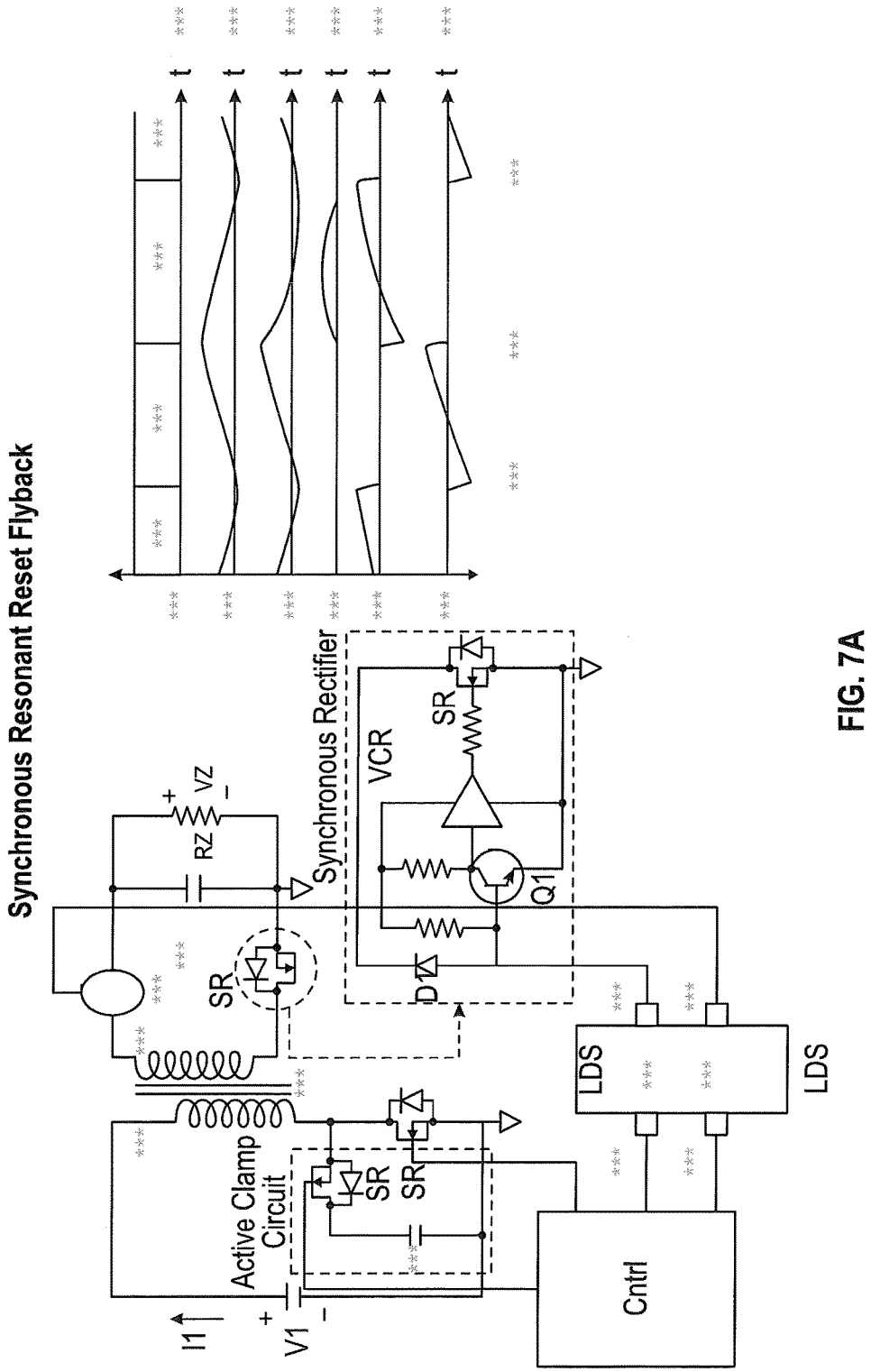
FIG. 7A shows how the present invention may be used to improve the efficiency of a synchronous flyback converter due to its wide bandwidth capability.
Figure 7B:
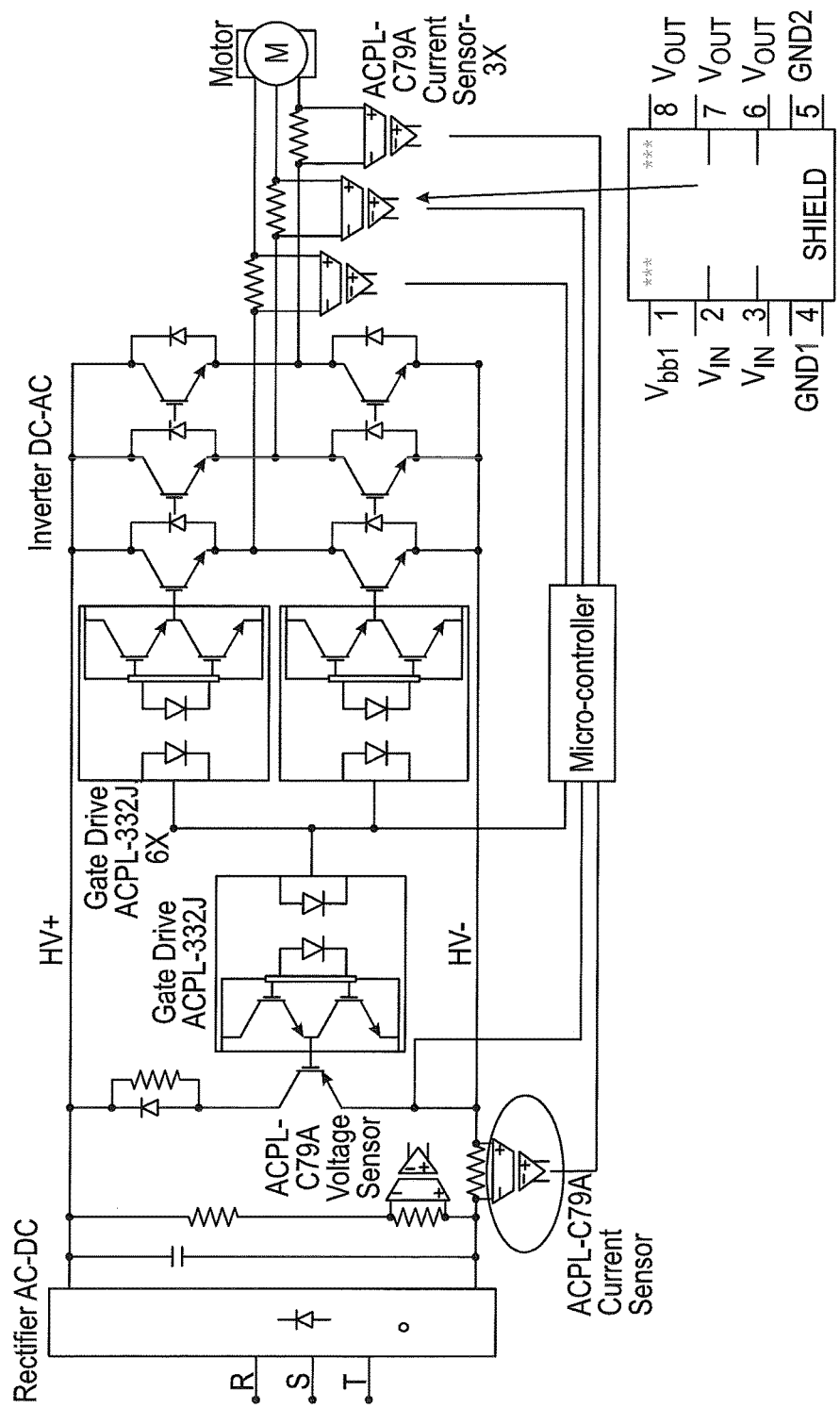
FIG. 7B shows a prior art high bandwidth optical isolating application which might be replaced by the current invention.

The ability to communicate information across an isolation barrier on a cycle by cycle basis or fast enough to handle faults means that high speed analog componentry does not need to be repeated on the secondary side of the isolation barrier. An example might be the synchronous flyback converter shown in FIG. 7A. This configuration is populator for cell phone and laptop adaptors whose size is limited by efficiency. By utilizing the proposed high bandwidth isolator as shown these power supplies can be reduced in size. In FIG. 7B, expensive wideband optocoupler components are used, however, which may be replaced by the proposed invention with greater reliability and lower cost.

Primary side regulators have been used in recent years to eliminate optocouplers. A populator method is to allow periodic resonating between the switch drain inductance and the magnetic inductance of the flyback transformer, and then to measure back a half cycle from the peak of the resonance as this is the point of minimum current and therefore least regulation. Ie. measuring from the primary at this point would read the correct secondary voltage if any systematic offsets from components like diodes are taken into account. Primary side regulators, however, have significant disadvantages. The first is a long recovery from light load when a step load change occurs since the regulator has to wait an entire period (a long one as the converter is usually in PFM at light load) before it can re-measure the output voltage. This is becoming too long for many specifications and governmental regulations and companies are being forced to reintroduce optocouplers just to deal with this recovery. Additionally, this technique cannot maximize the efficiency of synchronous controllers due to risk of shoot through while the proposed isolator has a wide enough bandwidth to reliability communicate the correct commutation point. This can improve efficiency 1-2% versus synchronous control schemes which do not communicate the current and/or voltage information required to determine the optimal commutation point to the controller.

Embodiments of the monolithic isolator may be required to operate at elevated temperatures as most AC/DC and DC/DC systems generate a lot of heat. Other systems such as LED AC/DC drivers also require isolators which reside close to the source of generated heat. Optocouplers generally degrade quickly at such temperature and therefore the existing state of the art is poor when it comes to operating in high temperature applications. Embodiments of the inventive monolithic isolator may utilize silicon-on-sapphire (SOS) for handling the high operating temperatures. SOS is an emerging technology shown to be capable of operating to high temperatures. In SOS applications thin film active devices are deposited on a low leakage sapphire substrate. The thinness of the resulting devices, and absence of any leakage to substrate allows active circuits to operate above 200° C., whereas standard silicon is usually restricted to 150° C. operation. Furthermore, the use of z-domain techniques in embodiments of the invention acts to further enhance high temperature operation as the discrete structures (delay cells, inverters, etc.) tend to be far less sensitive to leakage than precision analog devices. Thus the inventive structures represent an optimized high temperature solution.

In specific inventive embodiments capacitive couplers may be replaced with an alternative on-chip coupled magnetic configuration. With the on-chip coupled magnetic configuration, two on chip inductors are separated by an isolation layer, or through chip via with inductors suspended on each side of the via.

Figure 2B:
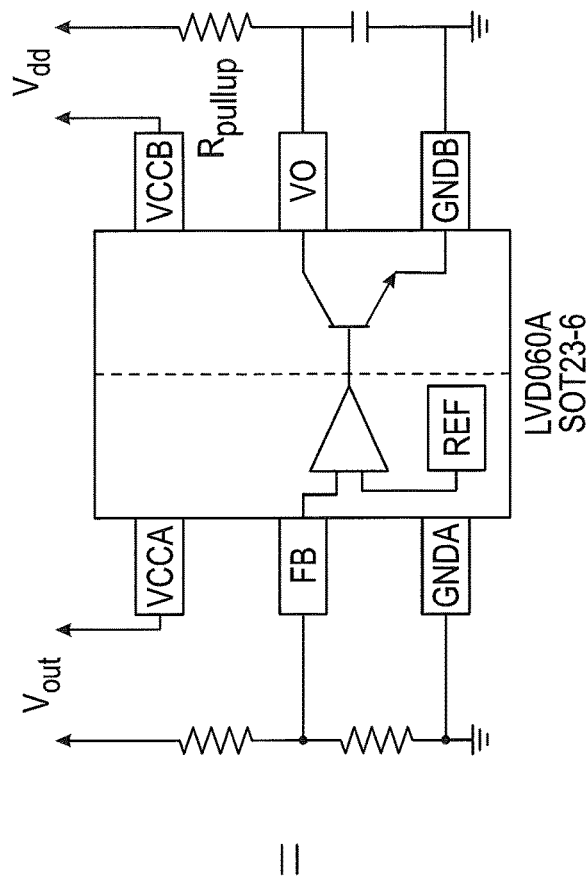
FIG. 2B is a schematic of the inventive isolator as a replacement of the circuit of FIG. 2A.
Figure 2A:
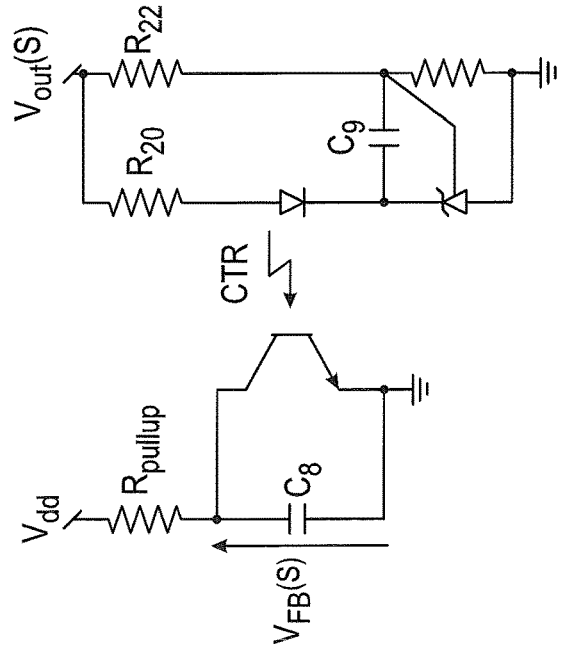
FIG. 2A is a prior art schematic of a TL431 and optocoupler.
Figure 4:
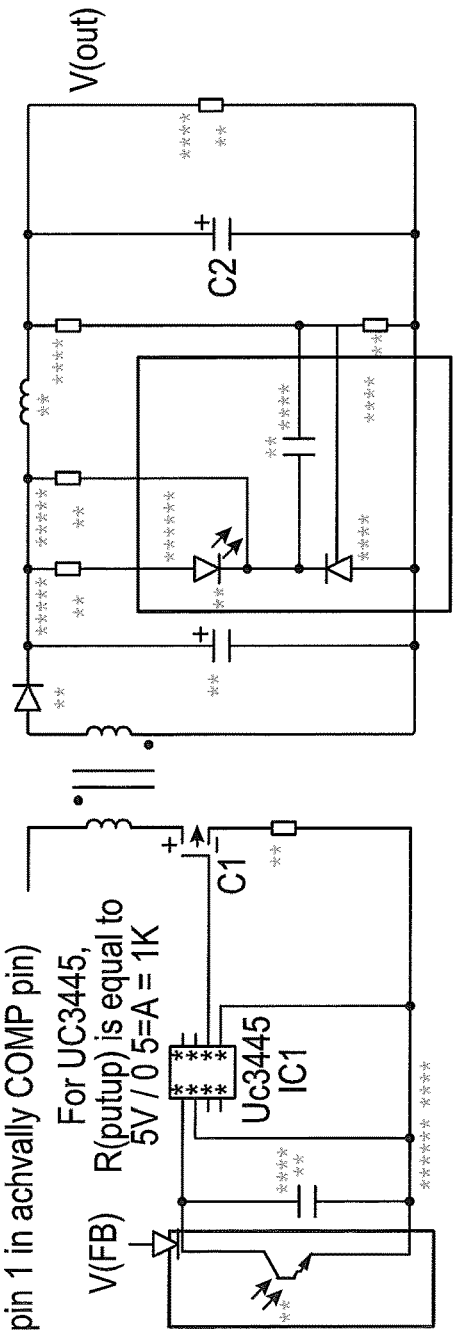
FIG. 4 is a schematic of a prior art isolated power supply converter, where the boxed components may be replaced with embodiments of the inventive isolator.
Figure 5:
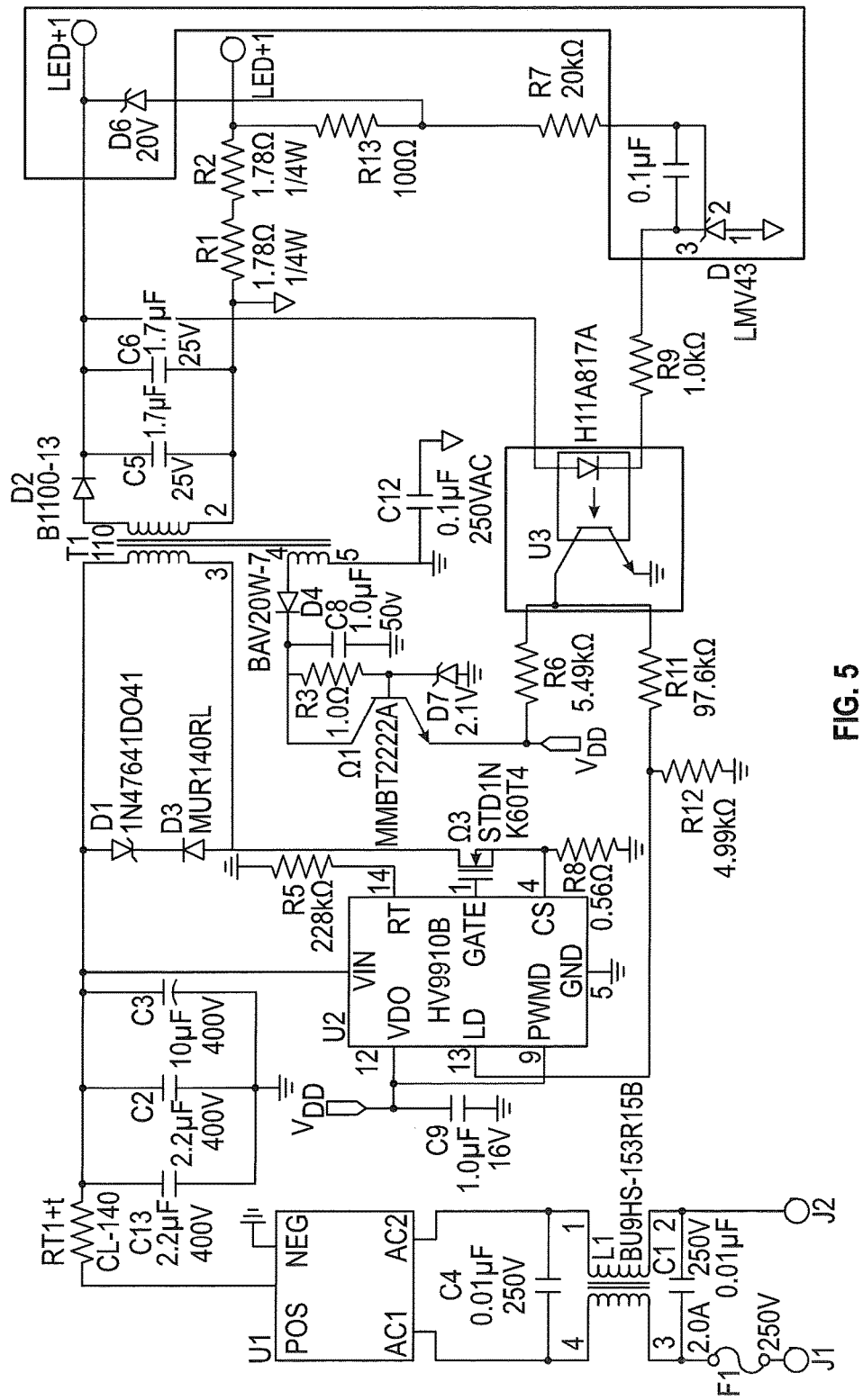
FIG. 5 is a schematic of a prior art offline LED driver where boxes surround components that may be replaced with embodiments of the inventive isolator.
Figure 6:
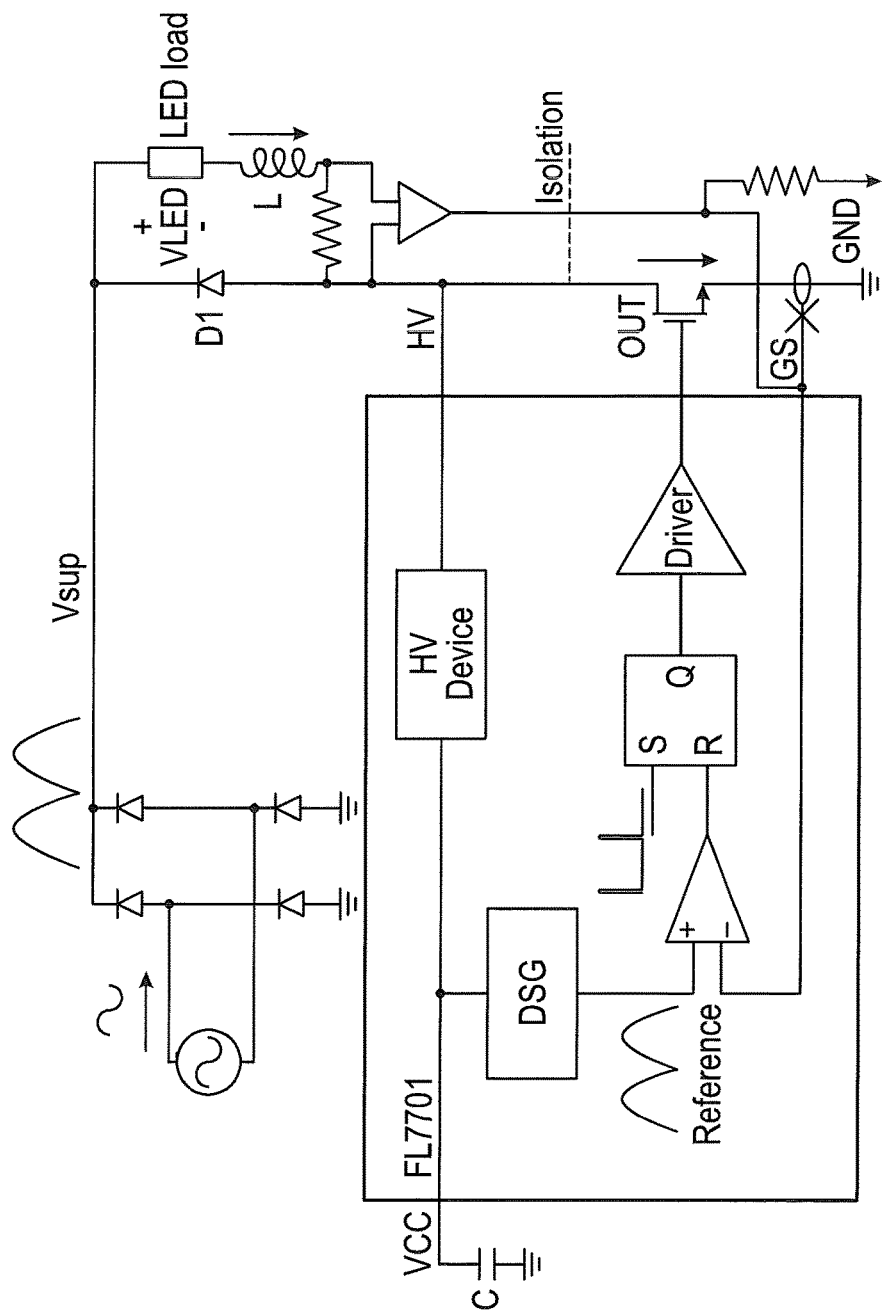
FIG. 6 is an LED driver schematic using a current side amplifier (CSA) employing an embodiment of the inventive isolator.
Figure 8:
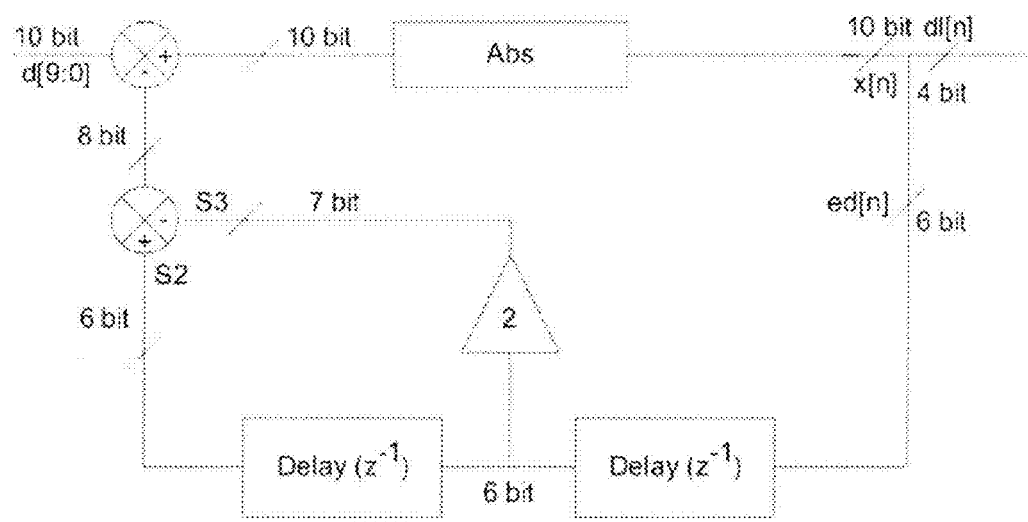
FIG. 8 is a block diagram of an error feedback structure sending only the four most significant bits (MSB) from the quantizer output across a barrier to maximize bandwidth.
Figure 9:
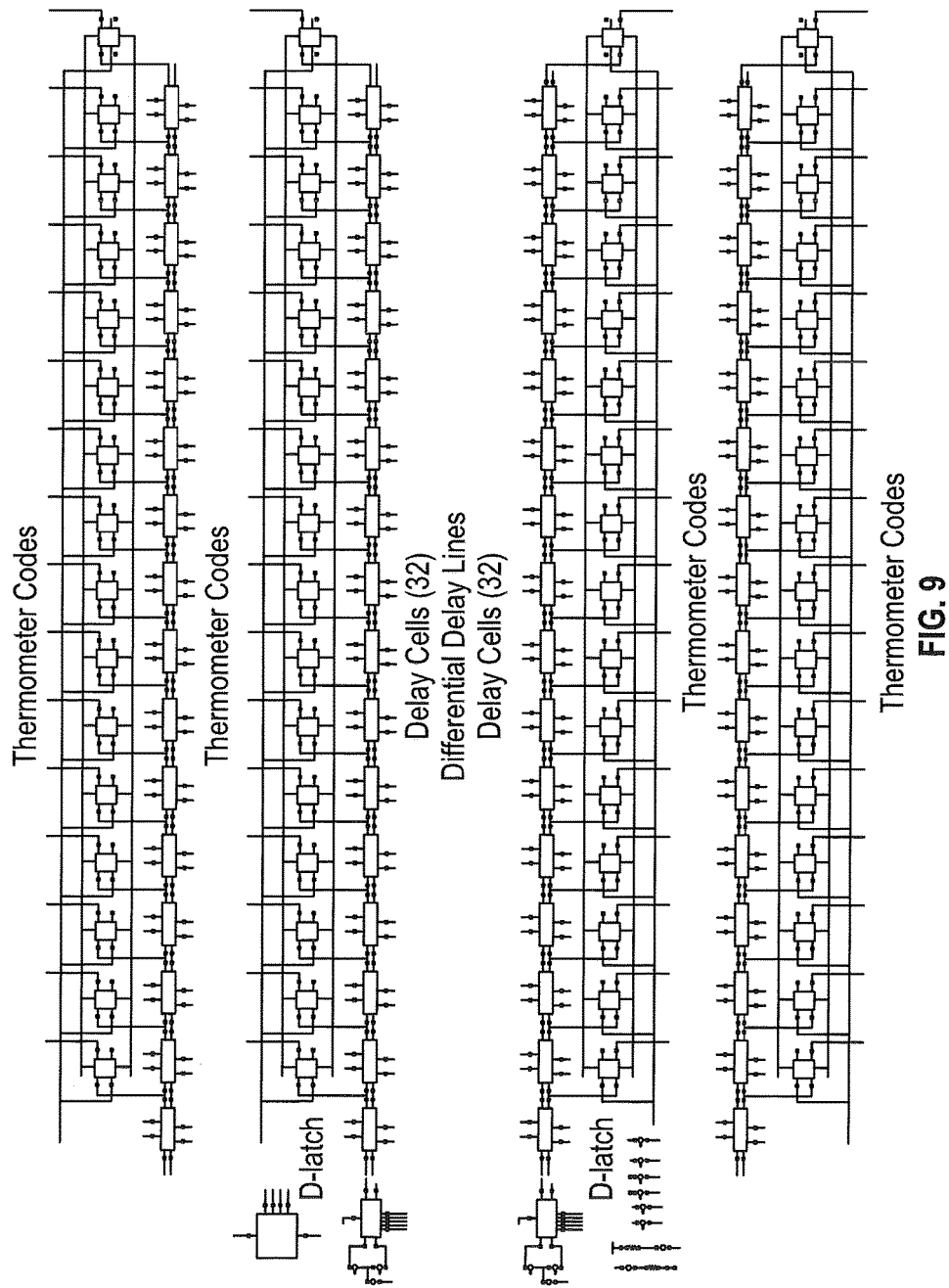
FIG. 9 is a schematic of a delay line error measurement circuit configuration.
Figure 10:
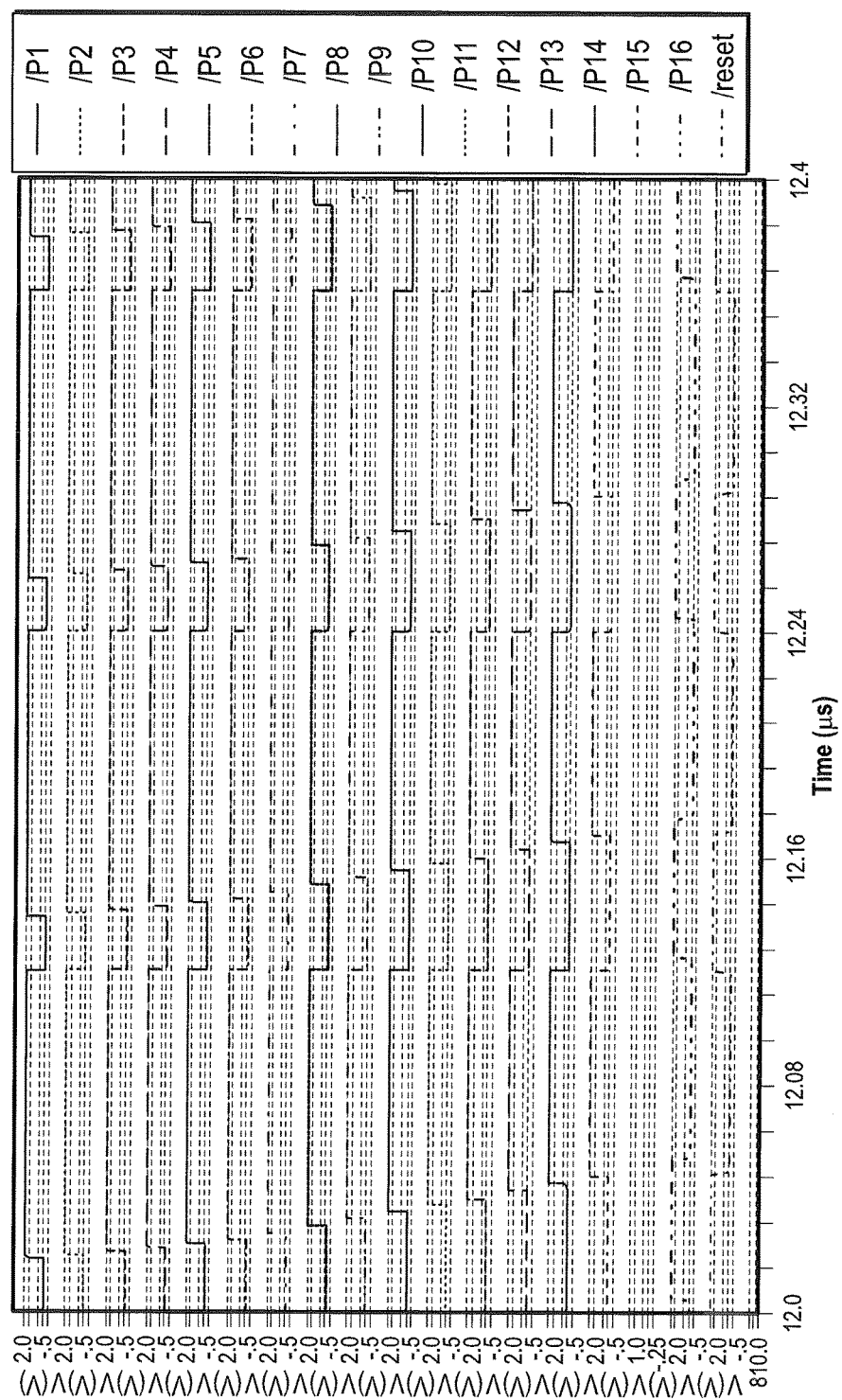
FIG. 10 is a presentation of delay line measurement output.

Referring now to the figures, FIG. 1 is a block diagram of a proposed isolator. FIG. 2A is a prior art schematic of a TL431 and optocoupler that can be replaced with embodiments of the invention. FIG. 2B is a schematic of the inventive isolator as a replacement of the circuit of FIG. 2A. FIG. 3A is a schematic of an embodiment of the inventive isolator which may be connected to a passive network (not shown) or which may accept a digital input to establish AC parameters. FIG. 3B is a schematic of an embodiment of the inventive isolator with a digital communication path across the isolator which share the isolator. FIG. 4 is a schematic of a prior art isolated converter, where the boxed components may be replaced with embodiments of the inventive isolator. FIG. 5 is a schematic of a prior art offline LED driver where boxes surround components that may be replaced with embodiments of the inventive isolator. FIG. 6 is a schematic of a high side LED driver which uses a current side amplifier (CSA) employing an embodiment of the inventive isolator to communicate measured current from the high side to the low side controller. FIG. 7A shows how the present invention may be used to improve the efficiency of a synchronous flyback converter due to its wide bandwidth capability. FIG. 7B shows a prior art high bandwidth optical isolating application which might be replaced by the current invention. FIG. 8 is a block diagram of an error feedback, structure sending four most significant bits (MSB) across the isolator and the other quantizer bits (LSB) to the modulator. FIG. 9 is a schematic of a delay line error measurement circuit configuration. FIG. 10 is a presentation of delay line measurement output.

The circuits and configurations described above represent a demonstrated method of efficiently implementing an isolator without limit cycle oscillation concerns, however, those skilled in the art may know of other structures which may replace specific portions of the described embodiment while still requiring use of the inventions taught in this application.

The foregoing description is illustrative of particular embodiments of the invention, but is not meant to be a limitation upon the practice thereof. The following claims, including all equivalents thereof, are intended to define the scope of the invention.

The invention claimed is:
1. An isolation circuit comprising:
an isolating barrier;
an error measurement device coupled to a reference and to a feedback signal;
a z-domain modulator coupled to said error measurement device and to said isolating barrier; and
wherein said z-domain modulator generates a z-domain differential delay signal, said z-domain differential delay signal used to generate an error in conformance with a difference between said reference and said feedback signal, said z-domain modulator transferring a subset of digital information across said isolating barrier lowering required isolator bandwidth.
2. The isolation circuit of claim 1 further comprising:
a decimation circuit coupled to a secondary side of said isolating barrier, the decimation circuit having a digital output.
3. The isolation circuit of claim 1 further comprising:
a digital to analog converter coupled to the decimation circuit converting the digital output to an analog output.

4. The isolation circuit of claim 1, wherein the z-domain modulator has a delta sigma configuration.

5. The isolation circuit of claim 1, wherein said subset of digital information is Most Significant Bits (MSBs) data of the z-domain differential delay signal transferred across to a secondary side of the isolating barrier and Least Significant Bits (LSBs) data of the z-domain differential delay signal feedback on a primary side of said isolating barrier.

6. The isolation circuit of claim 5, wherein said digital information communicates power line carrier, dimming signals, sensor or control data to devices on the secondary side of the isolator.

7. The isolation circuit of claim 1, wherein said isolation circuit is fabricated with a silicon-on-sapphire process to allow for high temperature operation.

8. The isolation circuit of claim 1, wherein said error measuring circuit is a differential delay line.

9. The isolation circuit of claim 1, wherein said z-domain modulator is at least one of a delta sigma z-domain modulator or an error feedback delta sigma modulator.

10. The isolation circuit of claim 1, comprising a digital compensator coupled to the error measurement device.

11. An isolation circuit containing:
   an isolating barrier;
   an error measuring circuit coupled to a reference and to a feedback signal;
   a compensator coupled to said error measuring circuit;
   a z-domain modulator coupled to said compensator and to said isolating barrier, said z-domain modulator being a delta sigma z-domain modulator; and
   wherein said z-domain modulator generates a z-domain differential delay signal, said z-domain differential delay signal used to generate an error in conformance with a difference between said reference and said feedback signal, said z-domain modulator transferring a first subset of said z-domain differential delay signal across said isolating barrier lowering required isolator bandwidth and a second subset of data of said z-domain differential delay signal feedback on a primary side of said isolating barrier.

12. The isolation circuit of claim 11, wherein said compensator is a proportional-integral-derivative (PID) compensator.

13. The isolation circuit of claim 11, wherein said compensator creates a loop bandwidth which conforms to an external passive or network external passive response, magnitude or to a digital input.

14. The isolation circuit of claim 11 further comprising a decimation circuit coupled to a secondary side of said capacitive coupling and one of a digital output buffer on said secondary side coupled to said decimation circuit and to an output, or a digital to analog converter coupled to said decimation circuit and to an output on the isolated side.

15. The isolation circuit of claim 11, wherein said first subset is Most Significant Bits (MSBs) data of the z-domain differential delay signal and said second subset is Least Significant Bits (LSBs) data of the z-domain differential delay signal.

* * * * *